(12) United States Patent
Koehn et al.

(10) Patent No.: US 10,703,051 B2
(45) Date of Patent: Jul. 7, 2020

(54) FABRIC PINCH SACK-MAKING MACHINE, PINCH SACK AND METHOD FOR THE PRODUCTION THEREOF

(75) Inventors: Uwe Koehn, Osnabrueck (DE); Andreas Staat, Lienen (DE); Roger Bannister, Crossett, AR (US)

(73) Assignee: WINDMOELLER & HOELSCHER KG, Lengerich (DE)

( * ) Notice: Subject to any disclaimer, the term of this patent is extended or adjusted under 35 U.S.C. 154(b) by 368 days.

(21) Appl. No.: 13/512,759

(22) PCT Filed: Nov. 30, 2010

(86) PCT No.: PCT/EP2010/007242
§ 371 (c)(1),
(2), (4) Date: Oct. 4, 2012

(87) PCT Pub. No.: WO2011/072801
PCT Pub. Date: Jun. 23, 2011

(65) Prior Publication Data
US 2013/0016926 A1    Jan. 17, 2013

(30) Foreign Application Priority Data

Nov. 30, 2009  (DE) .......................... 10 2009 056 078

(51) Int. Cl.
*B31B 70/26* (2017.01)
*B29C 65/00* (2006.01)
(Continued)

(52) U.S. Cl.
CPC ...... *B29C 66/83413* (2013.01); *B29C 65/103* (2013.01); *B29C 66/1352* (2013.01); *B29C 66/43121* (2013.01); *B29C 66/73711* (2013.01); *B29C 66/81465* (2013.01); *B29C 66/71* (2013.01); *B29C 66/73921* (2013.01); *B31B 70/262* (2017.08); *B31B 70/36* (2017.08); *B31B 70/644* (2017.08)

(58) Field of Classification Search
CPC .... B29C 65/10; B29C 65/103; B29C 66/1122
USPC ....... 493/178, 162, 168, 218, 219, 243, 251, 493/250, 255, 256
See application file for complete search history.

(56) References Cited

U.S. PATENT DOCUMENTS 3,381,448 A * 5/1968 Ayres et al. ................. 53/370.9
3,562,920 A * 2/1971 Vuilleumier et al. .. B29C 65/10
156/497

(Continued)

FOREIGN PATENT DOCUMENTS

DE    2 157 184      5/1973
DE    198 04 735     8/1999

(Continued)

OTHER PUBLICATIONS

WO0105671Translation.*

*Primary Examiner* — Jes F Pascua
*Assistant Examiner* — Nina K Attel
(74) *Attorney, Agent, or Firm* — Jacobson Holman, PLLC.

(57) ABSTRACT

A pinched sack, which is made at least partially from a plastic material in the form of a tube section, has at least one pinched bottom at one end of the tube section. At least some of the plastic material is stretched, and at least one pinched bottom is provided by a thermally induced bonding process.

7 Claims, 12 Drawing Sheets

(51) Int. Cl.
   *B29C 65/10*   (2006.01)
   *B31B 70/36*   (2017.01)
   *B31B 70/64*   (2017.01)

(56) References Cited

U.S. PATENT DOCUMENTS

| | | | |
|---|---|---|---|
| 4,088,264 A * | 5/1978 | Vogt | B65D 75/26 |
| | | | 383/111 |
| 4,274,896 A | 6/1981 | Bosse | |
| 4,373,979 A | 2/1983 | Planeta | |
| 4,610,651 A | 9/1986 | Jacobson et al. | |
| 5,845,995 A | 12/1998 | Starlinger Huemer | |
| 6,454,689 B1 | 9/2002 | Voss | |
| 6,800,051 B2 | 10/2004 | Koehn | |
| 7,137,941 B2 * | 11/2006 | Gamache | B31B 1/36 |
| | | | 493/134 |
| 2009/0019817 A1 * | 1/2009 | Selle et al. | 53/399 |
| 2009/0159192 A1 * | 6/2009 | Bannister | 156/250 |
| 2010/0029455 A1 | 2/2010 | Skopek et al. | |
| 2011/0019944 A1 * | 1/2011 | Sargin | B65B 51/10 |
| | | | 383/120 |

FOREIGN PATENT DOCUMENTS

| | | |
|---|---|---|
| EP | 2117821 | 11/2009 |
| WO | WO 01/05671 | 1/2001 |
| WO | WO 2006/125585 | 11/2006 |

* cited by examiner

FABRIC PINCH SACK-MAKING MACHINE, PINCH SACK AND METHOD FOR THE PRODUCTION THEREOF

CROSS-REFERENCE TO RELATED APPLICATIONS

This is a national stage of PCT/EP10/007242 filed Nov. 30, 2010 and published in German, which claims the priority of German number 10 2009 056 078.5 filed Nov. 30, 2009, hereby incorporated by reference.

BACKGROUND OF THE INVENTION

Field of Invention

The invention relates to a pinched sack, a method for producing a pinched sack, a station to form pinched bottoms, as well as a device for the production of pinched-bottom sacks.

Description of the Prior Art

Pinched sacks are known. Like all common sacks they show a sack body, essentially comprising a tubular body and/or representing it. The pinched sacks comprise at least one pinched bottom, which closes one end of the sack body. It is created by folding one end of the tubular section, usually along a folding line, and fixating it at the sack wall. According to prior art, pinched sacks made from paper are known. They can be easily produced by hand or by an automated folding to shut the ends of the tubular sections. Generally glue is used to determine and/or fixate the folded-over tubular ends at a sack wall.

From the publication U.S. Pat. No. 6,800,051 B2 plastic sacks are also known showing glued pinched bottoms.

Recently the need for high-quality printed and extraordinarily stable sacks has been increased for the consumer sector. For example, animal feed shall be packed in such sacks. In addition to an appealing appearance required for the consumer sector they shall also be stable to such an extent that the sacks stacked in warehouses can withstand collisions, for example by shopping carts.

For the reasons mentioned, thick, resistant material is used to form the sacks. This thick, resistant material aggravates the formation of the bottom and renders it more expensive. Due to the return forces of the material against bending it may additionally occur that the bottoms can reopen during the curing of the glue or that quality defects develop at the adhesion. This may particularly occur in pinched bottoms, because the material here is folded over by 180°. Attempts have been made to correct the described quality defects via an expensive extended compression.

SUMMARY OF THE INVENTION

The objective of the present invention therefore comprises suggesting a sack made form a resistant but well printable material and still showing a bottom which can be beneficially formed. The objective is attained such that at least one pinched bottom of the sack is determined by a heat-induced bonding process.

In such processes the connection between the sack wall and the sack and/or tubular end section folded over cures when the sacks are cooling.

In addition to thermally induced adhesion processes, which are also advantageous, among other things sealing or welding processes are possible as the thermally induced bonding processes. Here, the sealing or thermal sealing leads to a bonding without the plastic material to be connected being liquefied to a melt. During welding some of the plastic material is partially transferred into a melt. The rapid fixation of the bottom is further facilitated when the pinched folding is covered with a bottom cover sheet.

A clever selection of the sack material can also lead to remarkable advantages for the formation of the bottom. For example, stretched material shows strong resistance, allowing the use of thinner material. Compound films or laminates can be used advantageously in this context, which include polyolefin material showing good stretching characteristics. Materials made from stretched plastic webs show particular resistance.

A very advantageously used material composition includes a stretched web, onto which a well printable film was adhered and/or laminated with the help of an extrudate.

It is advantageous for the tube section to be guided, at least during a portion of its production, perpendicularly in reference to its longitudinal axis through the sack production device and particularly through the station to form pinched bottoms. Generally, this occurs in a transportation system comprising a conveyer belt, among other things.

It is advantageous when the tube section is guided at least with one end through a guiding element during the formation of the bottom. This guiding element should be formed such that it closes one end of the sack. During the closing the tube section can advantageously be heated. In particular when the guiding element is made from metal it can be heated and this way transfer at least some of the thermal energy necessary for the bonding process to the tube section.

The heating with hot air during the closing of the end of the sack is advantageous. Here, the hot air can be blown into the u-shaped arch of the sack material forming during the closing and this way portions of the surface of the sack material, which shall adhere to each other, can be heated. When the guiding element is embodied with dual walls the sack material can be guided in this dual wall. This guiding element may taper in the traveling direction of the sacks so that the sack wall is made to contact.

For the purpose of this publication, a device performing several processing steps for the production of sacks is called a device to produce pinched sacks. Such a device shows several processing stations, in which processing steps are performed. Such devices are frequently called bottom layers, because the formation of the bottom is considered a decisive processing step. For the purpose of this publication the station to form pinched bottoms represents this processing station directly forming the pinched bottom. Such a processing station may comprise a separate transportation device for tube sections. Generally such a station is penetrated by a transportation device with several processing stations being allocated thereto.

BRIEF DESCRIPTION OF THE DRAWINGS

Additional exemplary embodiments of the invention are discernible from the present description and the claims. The individual figures show:

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
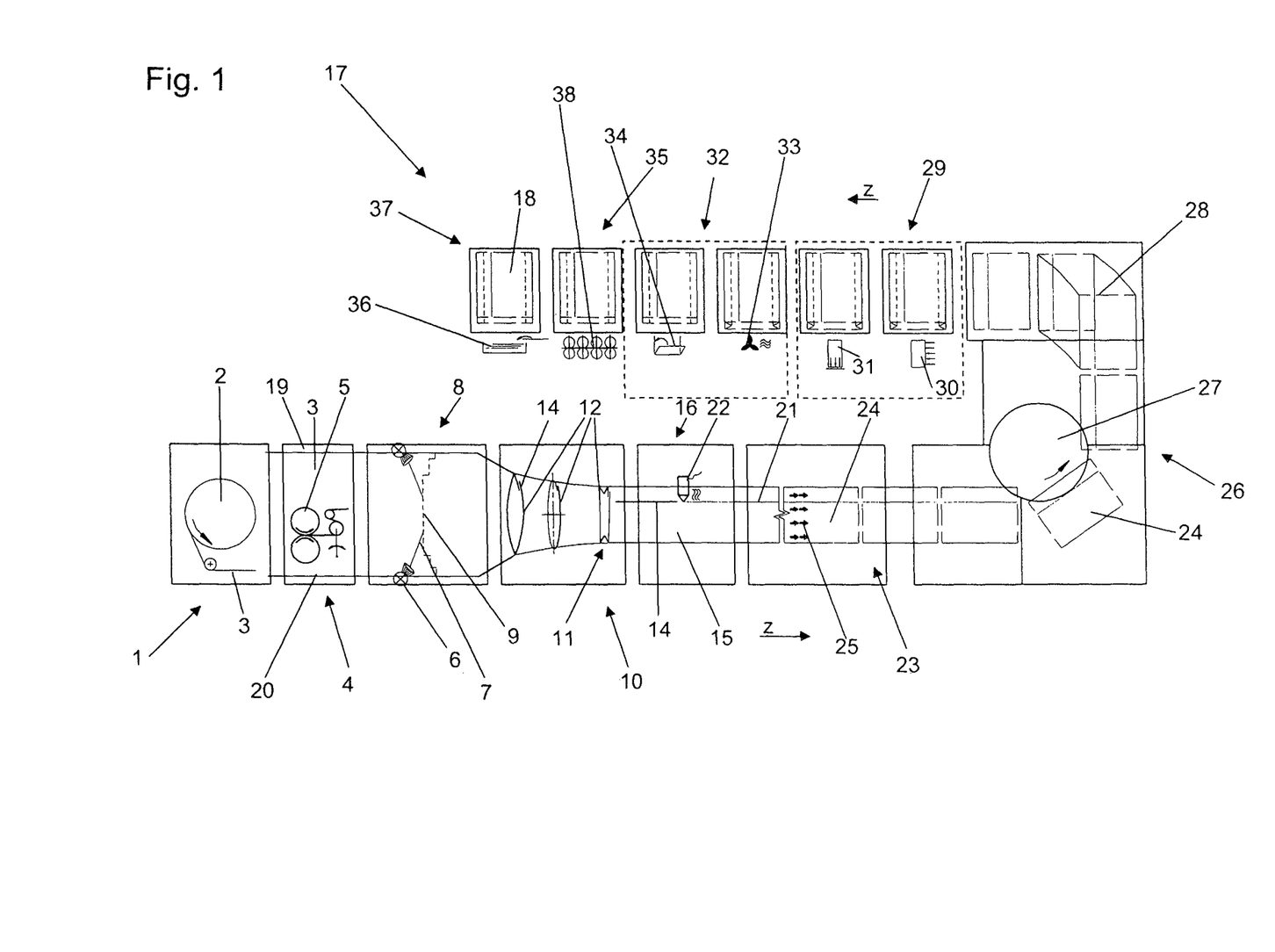
FIG. 1 top view of a schematic illustration of a device for producing sacks

FIG. 1 shows a top view of a schematic illustration of a device 17 for the production of sacks 18. The device 17 is shown very schematically, and frequently symbols indicate the function of the respective processing station. The device 17 for the production of sacks 18 begins the production process with a material web 3, which is unrolled in an unrolling station 1 from a material roll 2. The material roll 2, similar to many other symbols, is rotated by 90° for illustrative purposes. Subsequently the web 3 passes a stretcher 5 in a pre-stressing station 4. The pre-stressing symbol 5 is also shown rotated by 90°.

The web 3 reaches a perforation station 8, in which via lasers 6, emitting beams 7, cuts are inserted along the perforation line 9 into the web. It must also be mentioned that the perforation occurs prior to the tube formation and that here it is performed with the help of lasers 6. It shall also be pointed out that the perforation line 9 here is not a straight line. Details regarding this are stated in the following.

The now perforated web 3 reaches the tube formation station 10. Based on the symbols 12 it is shown how the cross section of the tube forms. Of course, these symbols also show the cross section rotated by 90°. It shall be mentioned that the formation of a tube 15 occurs from a flat-lying web 3 by said web being guided over a series of sheets and rolls, with lateral sections of the web 3 being folded over. In the proximity of the edges 19, 20 of the web 3, which now contact each other, a section with material 14 overlapping develops. In the device shown, during the tube formation, lateral folds 11 are also formed in the tube 15, thus laterally folded sacks 18 are produced. During further transportation in the travel direction z a longitudinal adhesion 21 is applied in the overlapping material section 14 in the longitudinal adhesion station 16. This process is shown by an extruder symbol 22. The use of a polyolefinic melt is advantageous. However, the longitudinal seam may also be formed by way of sealing or welding. Subsequently the tubular web 15 reaches a tearing station 23, in which the web 15 is subjected to longitudinal forces so that the tubular web 15 is separated into tube sections 24. The tearing process is symbolized by the arrows 25. The use of dual-belt conveyers is advantageous for tearing the tube sections.

Along its longitudinal axes, the tube sections are conveyed in the travel direction z into the rotation and deflection station 26, in which the tube sections 24 are rotated, which is caused by the rotary table 27, among other things. After the rotation a deflection can occur. Here, the rotated tube sections 24 are deflected along a path (e.g., curve) indicated by the symbol 28. It is advantageous for a rotation to occur by at least 90°.

In FIG. 1 now the longitudinal axes of the tube sections are aligned perpendicular in reference to their travel direction z.

In the aligning station 29 the tube sections 24 are aligned along two tube section edges (once perpendicular in reference to the travel direction z and once parallel thereto). This is illustrated by the symbols 30 and 31.

In the station 32 for the formation of pinched bottoms or the bottom-forming station 32 one end of the tube section 24 is heated (symbol 33) and then the folding of the respective end of the tube section upon the tube wall is performed (symbol 34). The bottom 62 formed in this manner is fixated in a compressing station 35. This frequently occurs in roller gaps between compression rolls (symbol 38). The finished sacks 18 are stacked in the storage station 37 (symbol 36). This advantageously occurs such that the bottoms of the sacks 18 are placed on top of each other.

FIGS. 2 through 10 sketch parts of exemplary embodiments of a bottom-forming station and subsequent compression rolls 38.

Figure 2:
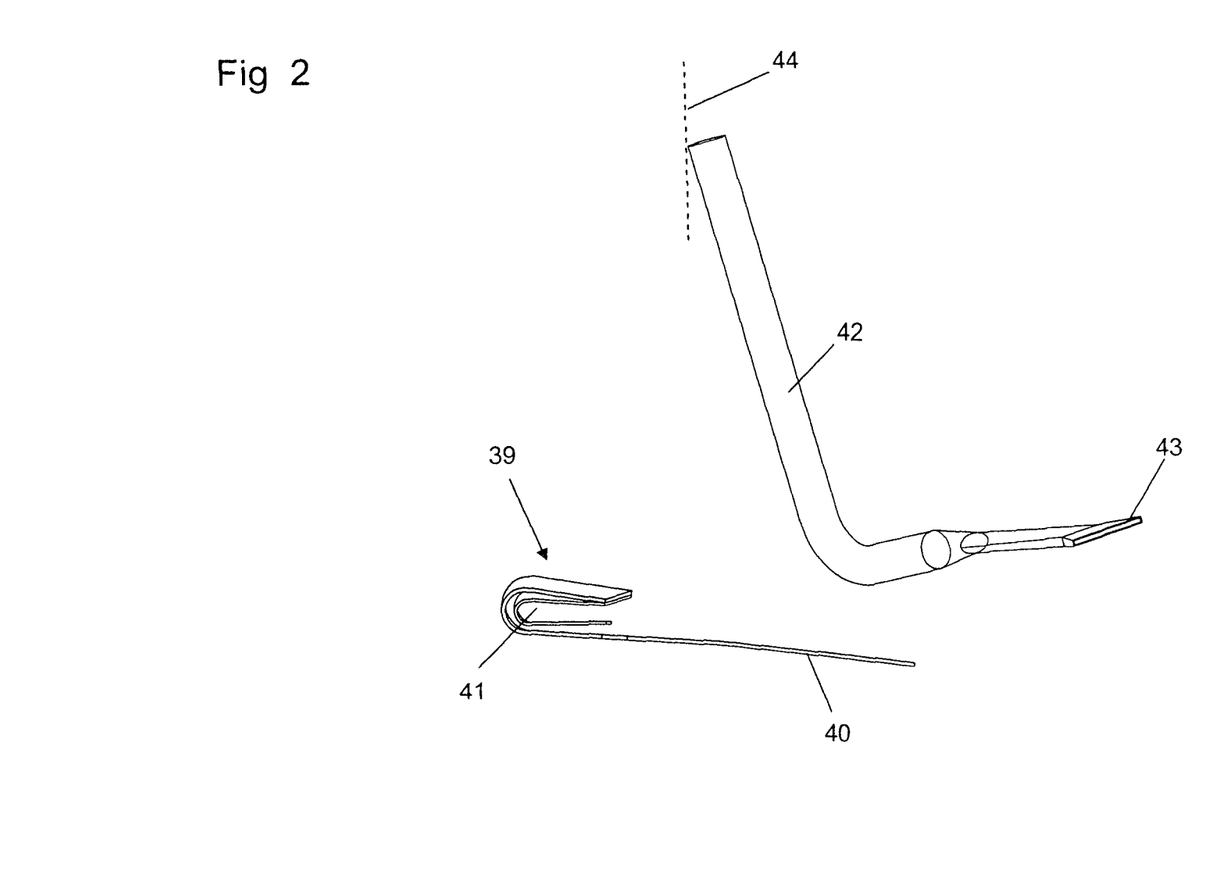
FIG. 2 a sketch of elements of a bottom-forming station

FIG. 2 shows a guiding element 39 comprising a cross section which is u-shaped. The guiding element 39 is dual-walled and can guide the sack material between its dual walls 45, 46. A conveyer table 40 is discernible next to the guiding element. In the interior chamber 41 of the guiding element 39 a jet 43 of a hot air tube 42 can be pivoted by a rotary motion (arrow 48 in FIG. 5) about an axis 44.

Figure 3:
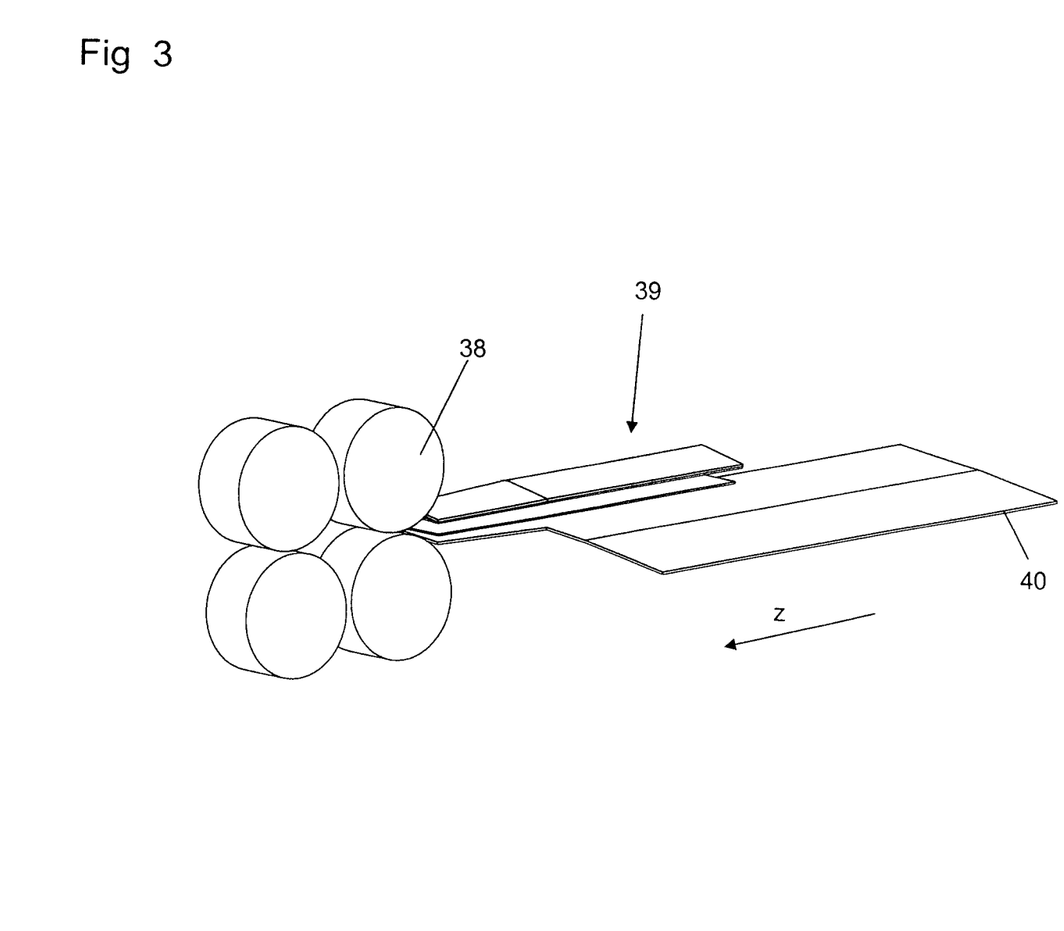
FIG. 3 a sketch of elements of a bottom-forming station and a compression station FIG. 4 another sketch of elements of a bottom-forming station and a compression station FIG. 5 a schematic top view of a bottom-forming station FIG. 6 a schematic top view of another bottom-forming station FIG. 7 a longitudinal cross section through a sack FIG. 8 a top view of a schematic illustration of another device for producing sacks FIG. 9 a section through a guiding element along a line B-B in FIG. 5
Figure 4:
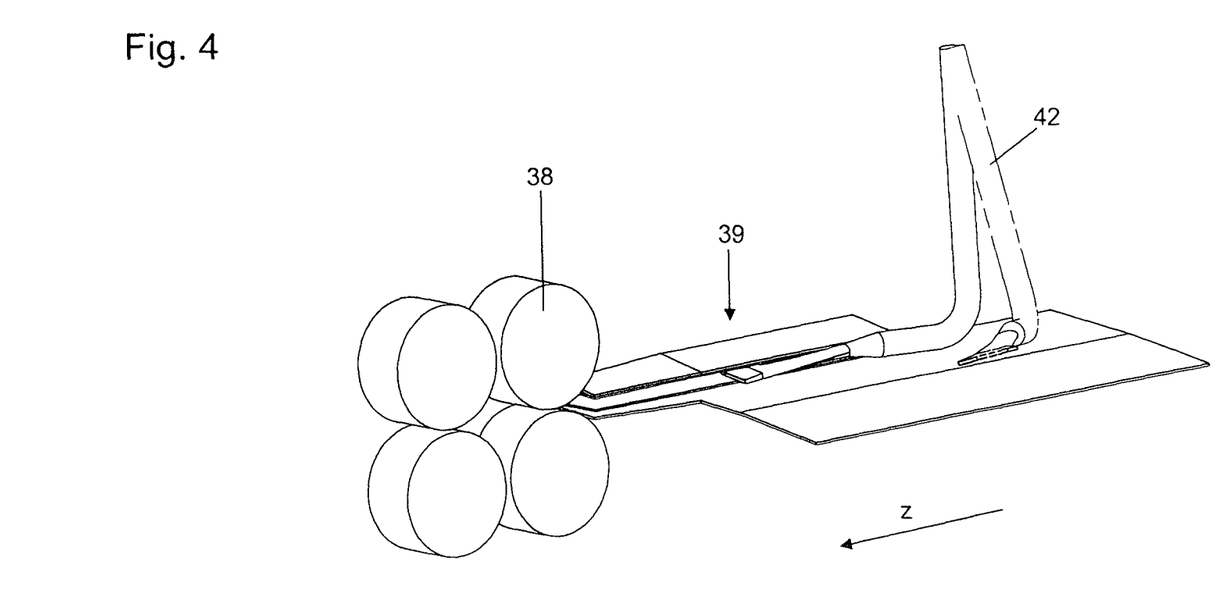

In FIG. 3 this bottom-forming station is shown from a different angle, with the compression rolls 38 being additionally illustrated, while the illustration of the hot air tube 42 is waived, though. However, the hot air tube 42 is shown in FIG. 4 both in a deflected state (dot-dash lines) as well, as in the operating position (continuous lines). In the operating position, the hot air tube blows hot air into the interior chamber 41 of the guiding element 39. And, as shown in FIG. 4, in the operating position, the hot air tube blows the hot air in the travel direction z of the transported tube section.

Figure 5:
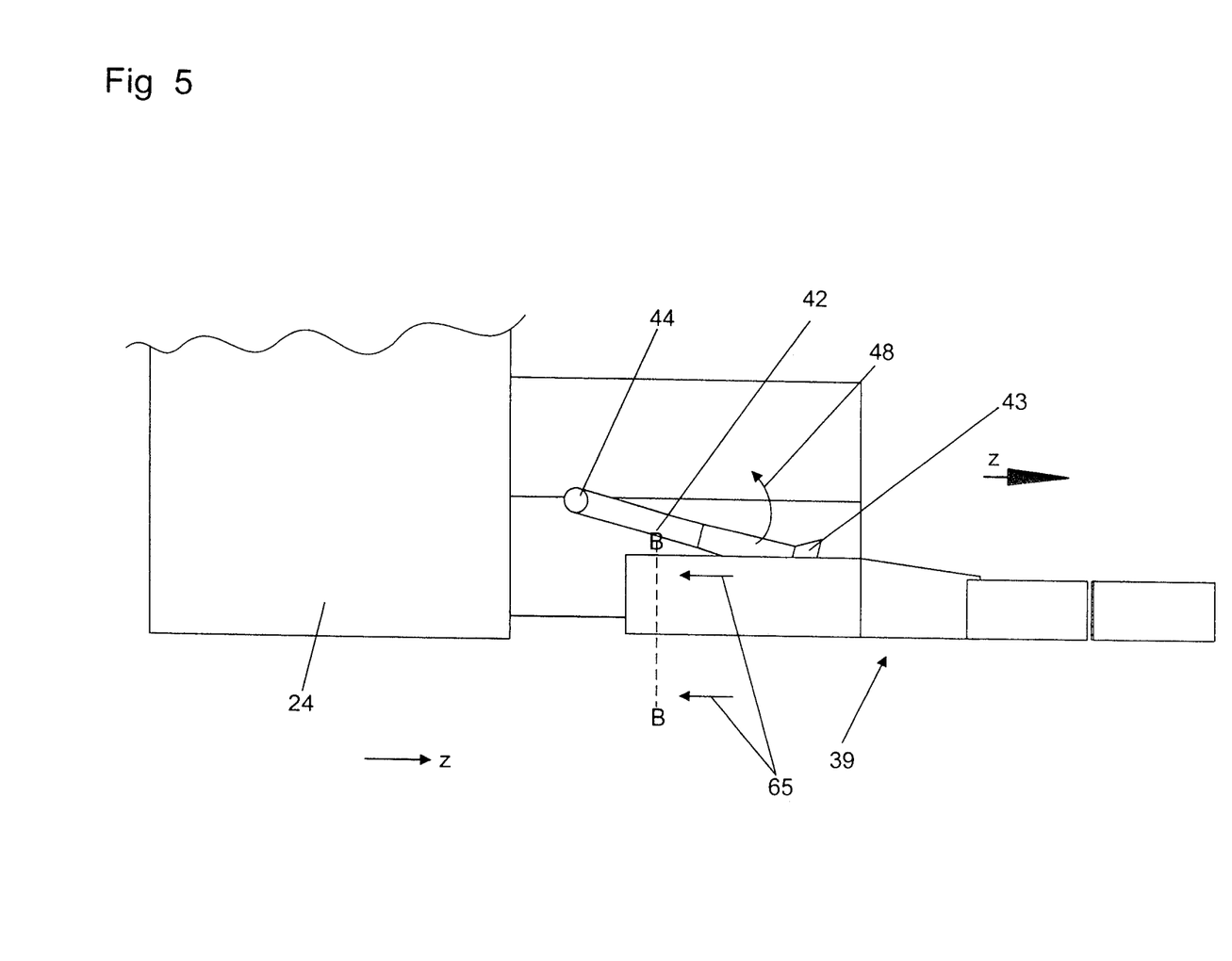
Figure 6:
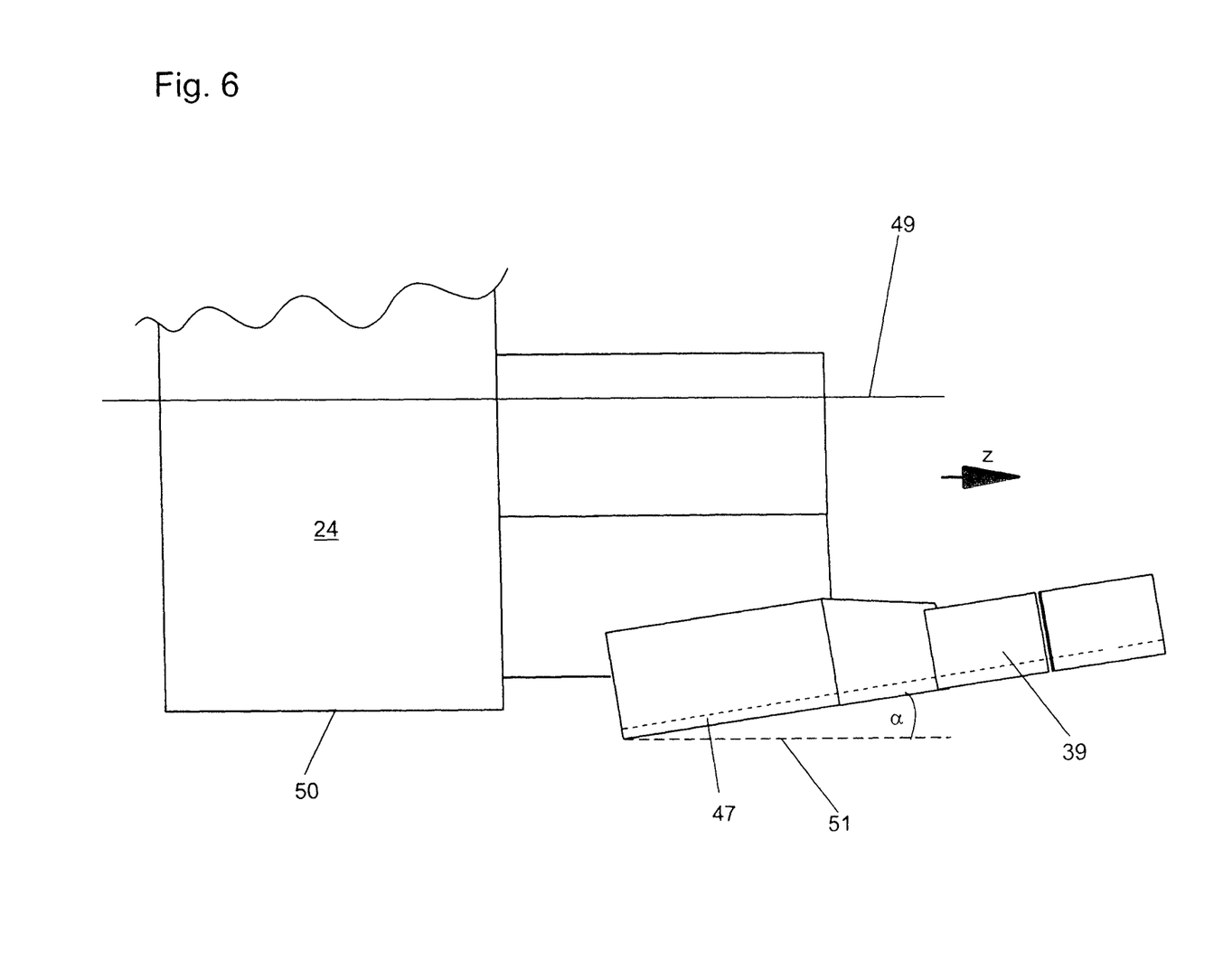
Figure 10:
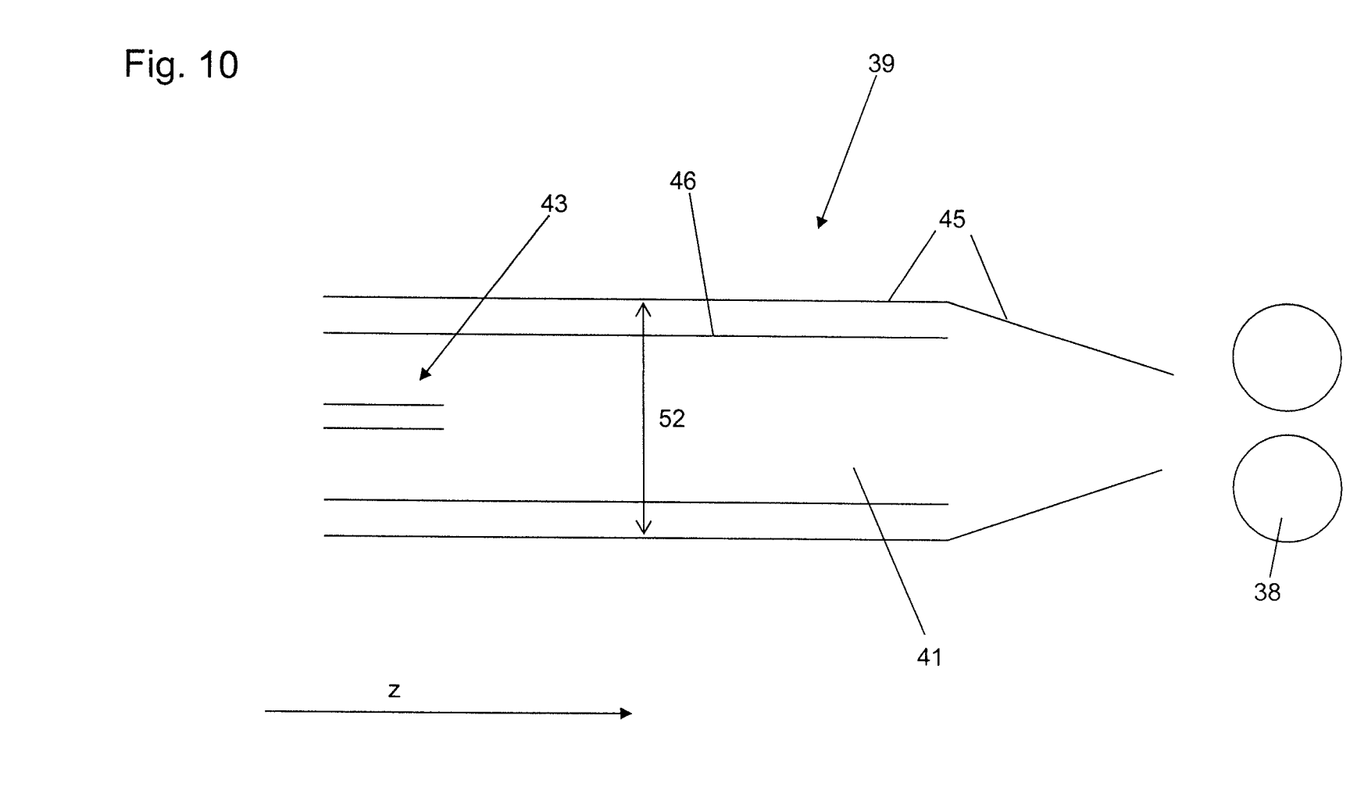
FIG. 10 a section through a guiding element along a line A-A in FIG. 9

FIG. 5 shows how a tube section 24 is transported in the direction towards the guiding element. During its motion towards the guiding element 39 the tube section is transported over the conveyer table 40, with the conveyer belt 49 here transmitting the force required. From the conveyer table 40 the end 50 of the tube section reaches the area between the walls 45 and 46 of the guiding element. Here the end 50 of the tube section 24 is folded over onto the front wall 53. During this process the sack material is heated by hot air in the area of the folding. In order to support this process the inner wall 46 of the guiding element 39 may be heated or it may be provided with recesses to allow the heated air to be able to reach the tube material. In general, the inner wall 46 ends in the travel direction z before the outer wall ends (FIG. 10). One or both walls of the tube section may taper like a funnel in the travel direction z. This way, the distance 52 between the exterior walls 45 of the guiding element 39 becomes smaller in the travel direction z. The line 47 is the section farthest apart from the center of the tube 56, in which the guiding element 39 (with its outer wall 45) guides the sack material. It is advantageous for this line 47 to be inclined in the travel direction z (travel direction shown by dot-dash line 51, incline shown generously by the angle α). It is frequently advantageous to incline the entire guiding element 39, as discernible from FIG. 6. In FIG. 6 the illustration of the hot air tube 42 has been omitted.

Figure 7:
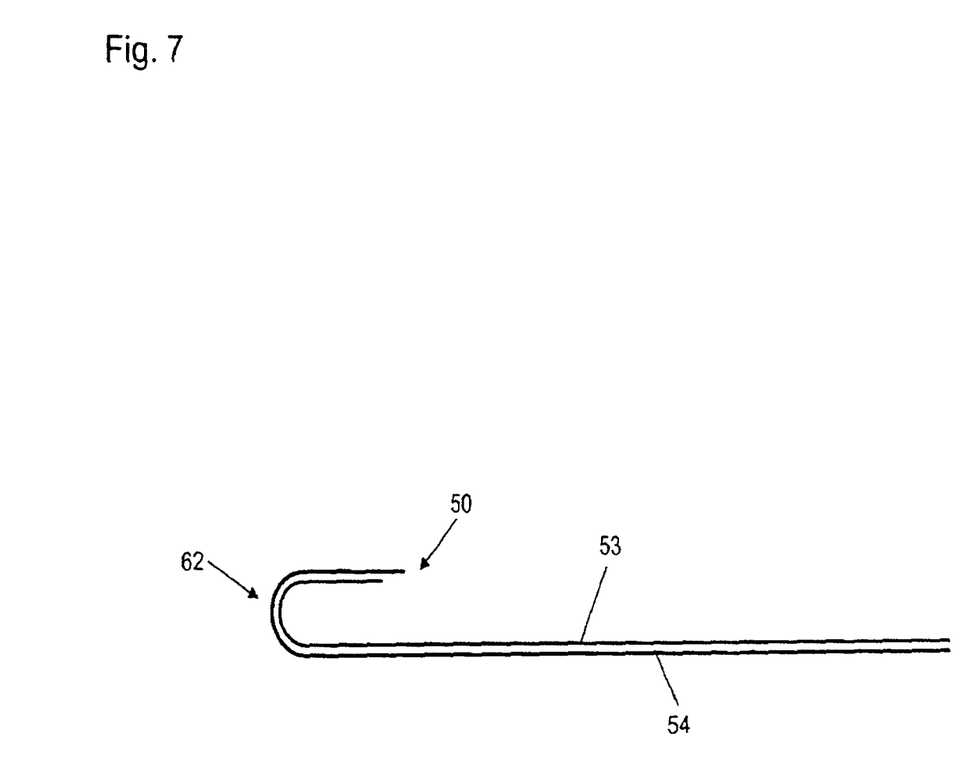
Figure 11:
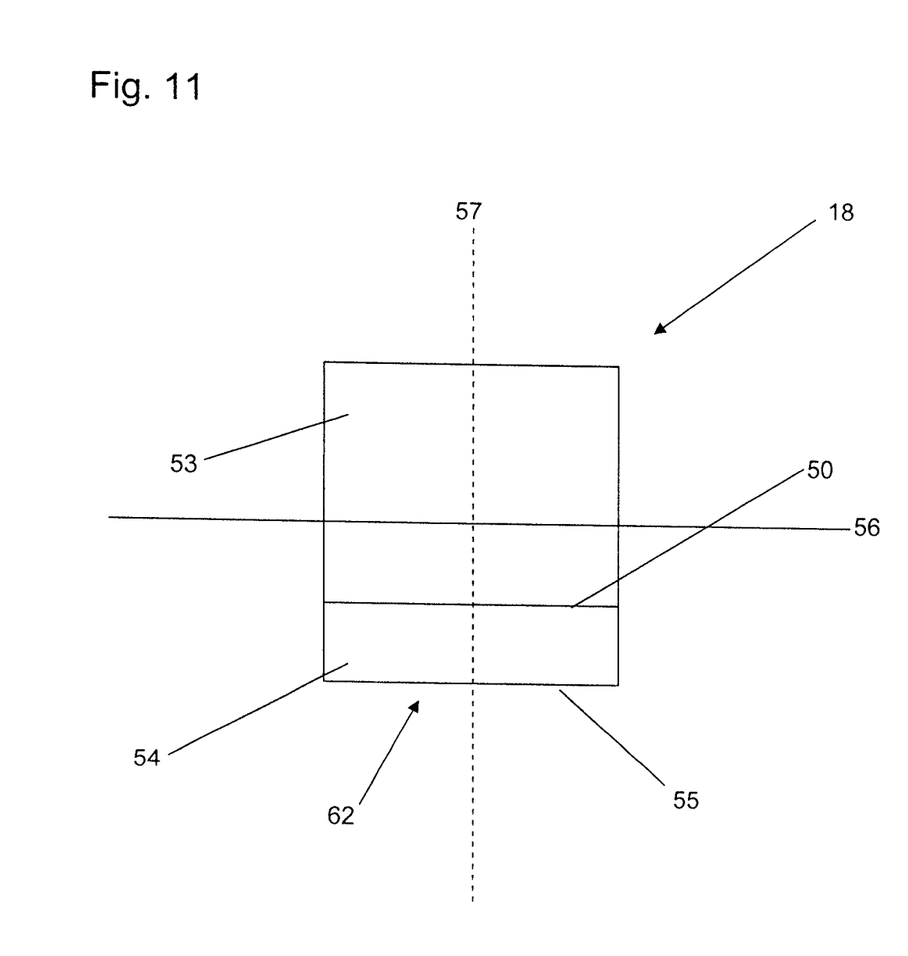
FIG. 11 a view of a sack from its front

FIG. 7 once more shows a cross section through a pinched sack 18, in which the end 50 of the tube section 24 is folded over onto the front wall 53 of the sack 18. Thus, the folding occurs about an angle of approximately 180° and here forms a folding line, which shows an angle of 90° in reference to the longitudinal axis of the tube section. It is also discernible that the front wall 53 folded over is shorter than the rear wall 54 folded over, which can develop from an uneven perforation cut 9 (FIG. 1). Such an embodiment is advantageous. Based on a view of a sack 18 from the front (front wall 53) FIG. 11 once more explains the same objects as FIG. 7. The center of the sack 56 and the axis of the tube section 57 are explained, here.

Figure 9:
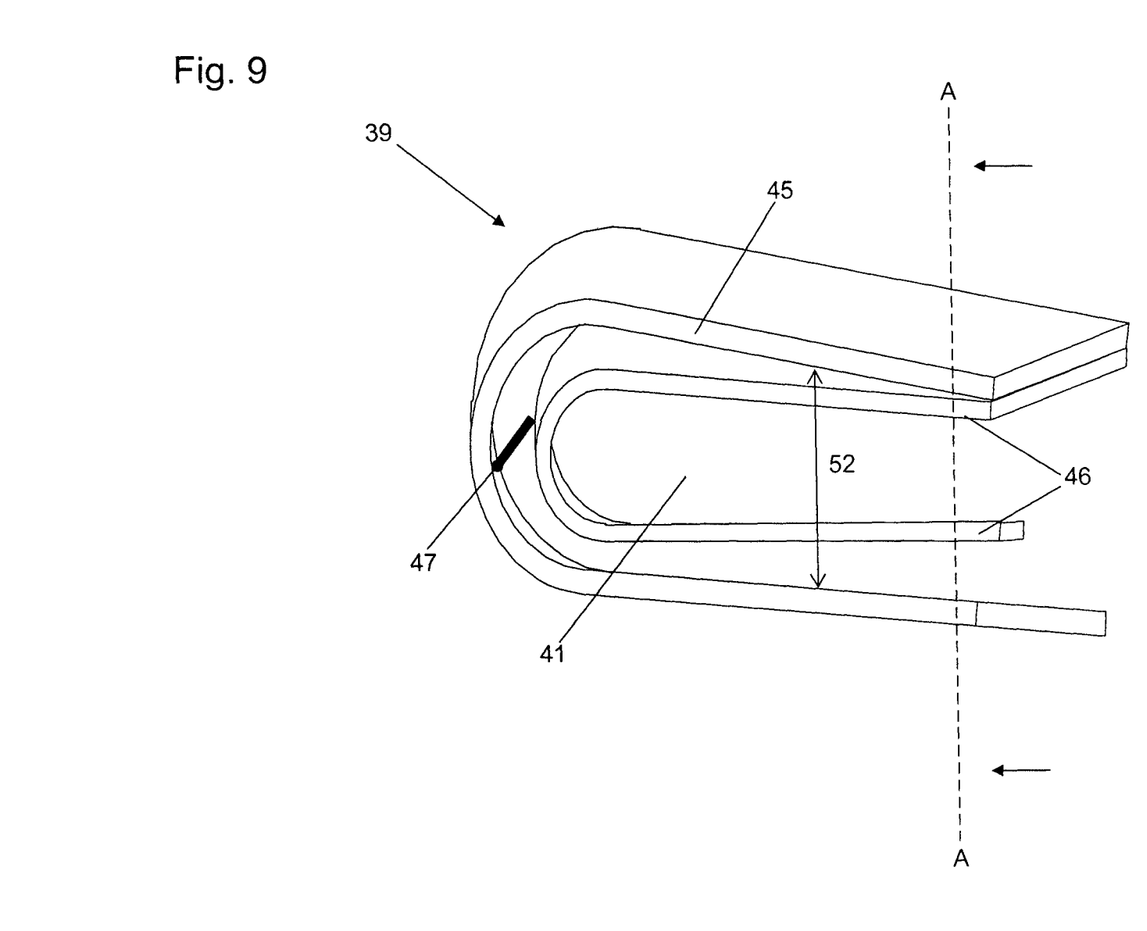

FIG. 9 shows, as already mentioned, the u-shaped cross section of the guiding element in a more detailed manner and clarifies, among other things, the importance of the distance 52 between the outer walls 45 of the guiding element as well as the importance of the guiding line 47. Such a cross section is discernible when the guiding element 39 in FIG. 5 is sectioned, viewed in the direction sketched by the arrows 65, and the view is reduced to the features of the guiding element 39.

FIG. 10 shows the cross section A-A through the guiding element 39, with hot air being blown into its interior space 41 by the nozzle 43.

Figure 8:
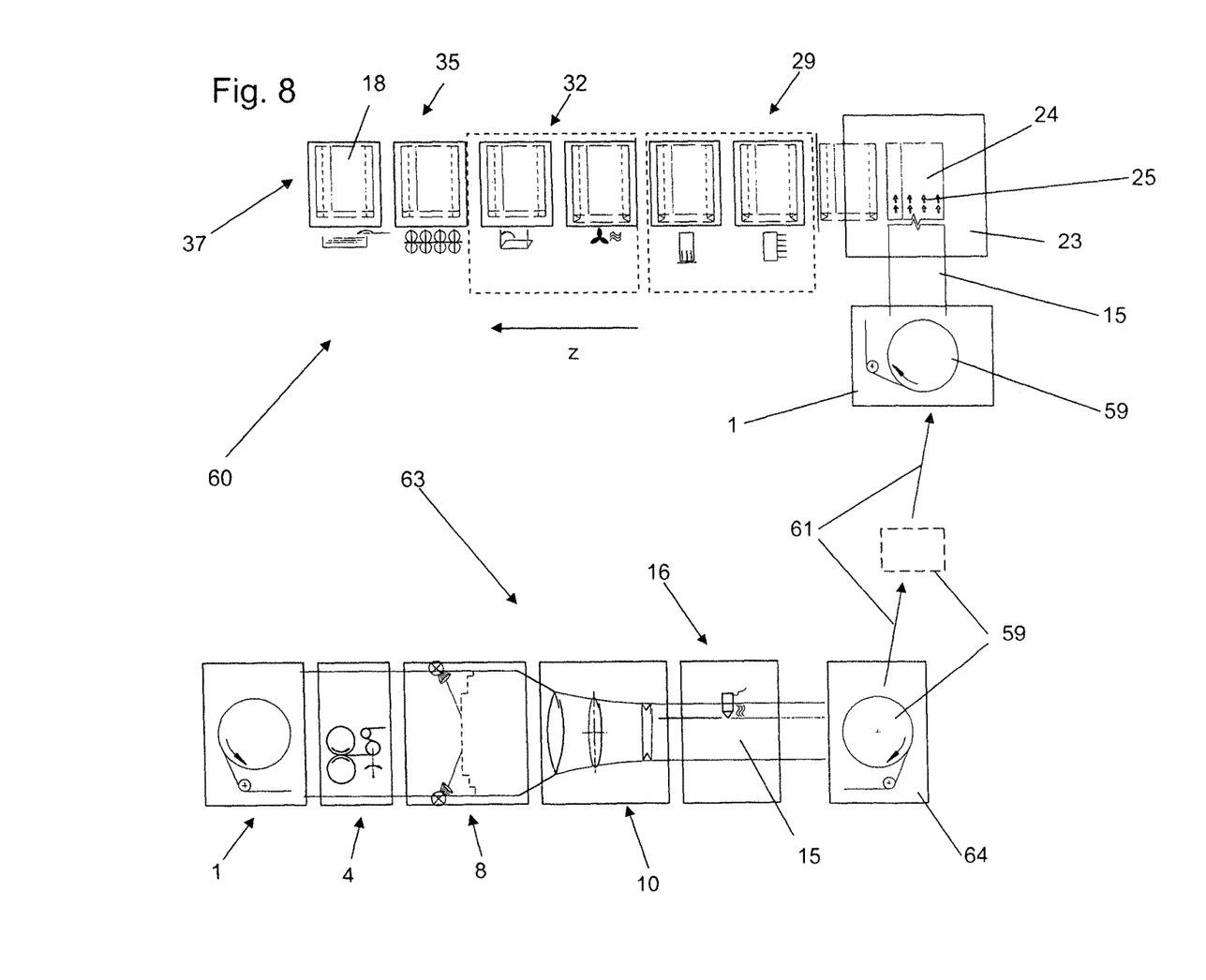
Figure 12:
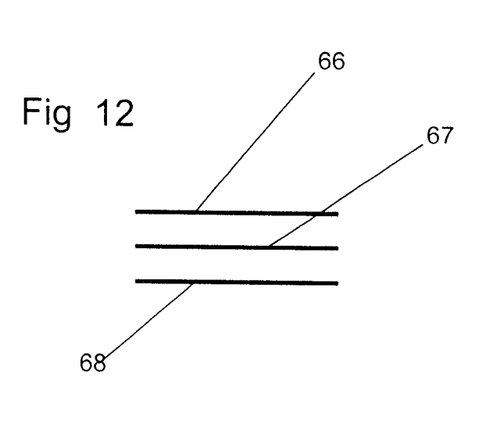
FIG. 12 a section through a preferred sack material

FIG. 8 shows an alternative device for the production of sacks 18, comprising two device components 60 and 63. The device component 63 represents a tube-forming device 63, whose first five processing stations 1, 4, 8, 10, and 16 are equivalent in their function to the identically numbered operating stations of the device 17 of FIG. 1. However, the tube 15, formed after the longitudinal adhesion station 16, is wound to a tube roll 59 in the winding station 64. As discernible by the arrows 61 and the angle 59 (dot-dash lines), it may be transported to the winding station 1 of the additional bottom-forming device 60. Here, the tubular web 15 is unwound and reaches the tearing station 23, in which it is separated into tube sections 24 (arrows 25). Instead of a tearing of the tube sections, other separating principles, such as lateral cutting, are also possible. The further transportation of tube sections 24 occurs in the travel direction z, which is perpendicular in reference to the unwinding direction of the tubular web 15. Transportation and processing occur by the stations 29, 32, 35, and 37, which in turn show the same functions as the identically numbered stations of the device 17. FIG. 12 shows a cross section through a preferred sack material from a web 66 (preferably a stretched polyolefin web), extrudate 67, and printable film 68. In general, these layers are connected to each other and not distanced. Intermediate layers, perhaps comprising paper, are also possible.

FIG. 12 once more shows the interior wall 46 of the guiding element 39, shown in FIG. 9, in a top view. Only the lateral guiding line 47 and the end line 69 of the outer wall 45 are shown in order to avoid hindering the view to the inner wall 46. The inner wall 46 shows a bead 70, i.e. its distance from the outer wall and thus also to the lateral guiding line is reduced and/or it points towards it. This has proven advantageous.

Here, a hot air nozzle blows air largely orthogonally in reference to the travel direction of the semi-finished sack material z into the interior space 41 of the guiding element 39 (in the x-direction). This beneficially occurs shortly before or behind the end of the inner wall in the z-direction. Here, the area is advantageous in which the inner wall 46 has just ended and the outer wall is still present. "Shortly before or shortly behind" means in this context less than 5 cm, advantageously however less than 3 cm. The distance between the guiding line 47 and the outlet of the nozzle 43 has proven critical as well. Here, it is advantageous if it can be adjusted to less than 3 cm. Even greater advantages can be achieved if this distance can be adjusted to 15 to 5 mm and if sacks are produced after the adjustment of the above-mentioned distances.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

LIST OF REFERENCE CHARACTERS 1 unrolling station
2 web winding
3 web/material web
4 pre-stressing station
5 pre-stressing symbol
6 laser
7 beam
8 perforation station
9 perforation line
10 tube-forming station
11 lateral folds
12 symbol for tube cross section
13
14 overlapping material
15 tube/bottom of the tube
16 longitudinal adhesion station
17 device for producing sacks
18 sacks
19 edge of the web
20 edge of the web
21 longitudinal adhesion
22 extruder
23 tearing station
24 tube sections
25 arrows
26 rotary and deflection station
27 rotary table
28 deflection
29 aligning station
30 symbol for aligning station
31 symbol for aligning station
32 station for forming pinched bottoms
33 symbol for heater
34 symbol for folding
35 compression station
36 symbol for storage
37 storage station
38 pressure rolls/symbol for pressure rolls
39 guiding element
40 table
41 interior chamber of the guiding element
42 hot air tube
43 nozzle
44 rotary axis
45 outer wall of the guiding element
46 inner wall of the guiding element 47 lateral guiding line
48 arrow showing rotary motion
49 conveyer belt
50 end of the tube section
51 line
52 distance
53 front wall
54 rear wall
55 folding line
56 center of tube/center of sack
57 longitudinal axis of the sack/tube section
58 winding station
59 tubular web winding
60 additional bottom layer/device component
61 arrow (transportation of the tubular web winding)
62 pinched bottom
63 additional bottom laying device/device component
64 winding station
65 arrows in the direction of view of FIG. 9
66 web
67 extrudate
68 film
69 end line of the outer wall of the guiding element
70 bead of the interior wall of the film guiding element
71 distance between the outlet of the nozzle 43 and the lateral guiding line 47

What is claimed is:

1. A station for the formation of pinched bottoms, in which ends of tube sections are folded over and are secured, said station sequentially comprising:
   a transportation device with which the tube sections are transported, in a travel direction (z), perpendicularly relative to a longitudinal axis thereof;
   a guiding element configured as a u-shaped cross section having a first leg and a second leg, with an interior chamber therein, with which an end of the tube sections is guided during the transportation by the transportation device; and
   a heating device with which the end of the tube sections is heated with hot air so as to effect a plasticizing thereof, including being configured to plasticize a flap of a tube section and a part of a front wall of the tube section on which the flap is pressed,
   the heating device including a hot air device that blows the hot air into the interior chamber of the guiding element with the hot air being blown in the travel direction (z) of the transported tube sections,
   the guiding element having a dual-walled configuration at least in partial sections thereof in the travel direction (z) of the tube sections,
   with the dual-walled configuration of the guiding element including an inner wall, and an outer wall, such that the hot air blown in the travel direction (z) of the transported tube sections is blown into an area of the guiding element in which the inner wall ends,
   the guiding element being configured such that a distance between the outer wall of the first leg and the outer wall of the second leg tapers to a lesser distance along the travel direction (z), so as to fold the plasticized flap upon the plasticized part of the front wall, to contact the folded plasticized flap with the plasticized part of the front wall, and to adhere the contacted folded plasticized flap to the plasticized part of the front wall to form the pinched bottom.

2. The station according to claim 1, wherein the heating device includes heating elements with which the guiding element is heated.

3. The station according to claim 1,
   wherein the inner wall ends in the travel direction (z) of the tube sections before the outer wall ends, and
   wherein the hot air is blown into a section of the guiding element at which the inner wall has already ended.

4. The station according to claim 1, wherein the inner wall includes at each end thereof a bead projecting farther in a spatial direction (x) perpendicular relative to the travel direction (z) of the tube sections in a direction of the outer wall than a remainder of the inner wall projects.

5. The station according to claim 1, wherein the tube sections have a material of construction configured for a thermally induced bonding thereof, and wherein the heating, device is configured to heat the end of the tube sections with the hot air so as to effect the plasticizing thereof.

6. A device for the production of pinched sacks, comprising:
   an unwinding device for unwinding a material web;
   a perforation device for perpendicular perforation of the material web;
   a tubing device for production of a tube from the material web;
   a tearing device with which the material web is torn off along perforation seams;
   a transportation device with which tubular sections are transported, in a travel direction (z), perpendicularly relative to a longitudinal axis thereof; and
   a station for formation of pinched bottoms, in which ends of the tubular sections are folded over and fastened, said station sequentially including
   a guiding element configured as a u-shaped cross section having a first leg and a second leg, with an interior chamber therein, with which an end of the tubular sections is guided during the transportation by the transportation device, and
   a heating device with which the end of the tubular sections is heated with hot air so as to effect a plasticizing thereof, including being configured to plasticize a flap of a tubular section and a part of a front wall of the tubular section on which the flap is pressed,
   the heating device including a hot air device that blows the hot air into the interior chamber of the guiding element, with the hot air being blown the travel direction (z) of the transported tubular sections,
   the guiding element having a dual-walled configuration at least in partial sections thereof in the travel direction (z) of the tubular sections,
   with the dual-walled configuration of the guiding element including an inn all and an outer wall, such that the hot air blown in the travel direction (z) of the transported tubular sections is blown into an area of the guiding element in which the inner wall ends,
   the guiding element being configured such that a distance between the outer wall of the first leg and the outer wall of the second leg tapers to a lesser distance along the travel direction (z), so as to fold the plasticized flap upon the plasticized part of the front wall, to contact the folded plasticized flap with the plasticized part, of the front wall, and to adhere the contacted folded plasticized flap to the plasticized part of the front wall to form the pinched bottom.

7. The device according to claim 6, wherein the perforation device is a laser perforation device located upstream of the tubing device in the travel direction (z) of the mate al web.

* * * * *